United States Patent
Shinohara et al.

(10) Patent No.: US 6,318,518 B1
(45) Date of Patent: Nov. 20, 2001

(54) ROTOR FOR EDDY CURRENT RETARDER

(75) Inventors: Kenjiro Shinohara, Amagasaki; Akiyoshi Ishida, Nishinomiya; Nobutaka Kishine, Amagasaki, all of (JP)

(73) Assignee: Sumitomo Metal Industries, Ltd., Osaka (JP)

( * ) Notice: Subject to any disclaimer, the term of this patent is extended or adjusted under 35 U.S.C. 154(b) by 0 days.

(21) Appl. No.: 09/386,855

(22) Filed: Aug. 31, 1999

(51) Int. Cl.$^7$ ....................................................... F16D 65/78
(52) U.S. Cl. ................................................. 188/264 AA
(58) Field of Search ...................... 188/18 R, 158, 188/159, 160, 218 R, 264 A, 264 AA

(56) References Cited

U.S. PATENT DOCUMENTS

| | | | |
|---|---|---|---|
| 3,583,533 | * | 6/1971 | Jones ................................. 188/218 R |
| 3,601,641 | * | 8/1971 | Baermann ............................... 310/93 |
| 5,023,499 | * | 6/1991 | Kuwahara ............................. 310/105 |
| 5,178,235 | * | 1/1993 | Montalvo, III et al. ............ 188/18 A |
| 5,538,113 | * | 7/1996 | White et al. ....................... 188/218 R |
| 5,842,547 | * | 12/1998 | Carlson et al. ....................... 188/267 |
| 6,039,157 | * | 3/2000 | Yamada et al. ....................... 188/158 |

FOREIGN PATENT DOCUMENTS

| | | |
|---|---|---|
| 05/33679A | 4/1993 | (JP) . |
| 06/253527A | 9/1994 | (JP) . |
| 07/329740A | 12/1995 | (JP) . |

\* cited by examiner

*Primary Examiner*—Robert J Oberleitner
*Assistant Examiner*—Benjamin A Pezzlo
(74) *Attorney, Agent, or Firm*—Burns, Doane, Swecker & Mathis, LLP

(57) ABSTRACT

A rotor for an eddy current retarder has a plurality of cooling fins provided around an outer surface of a drum. A transverse cross section of each of the cooling fins is rectangular or trapezoidal, and heights h of the cooling fins are equal, and the following expressions (1) to (3) are satisfied. Since this rotor is excellent in cooling ability, this is suitable as a rotor for a retarder of a large vehicle.

$$6 \text{ mm} \leq d \leq 11 \text{ mm} \quad (1)$$

$$25° \leq \theta \leq 55° \quad (2)$$

$$20 \text{ mm} \leq H \leq 200 \text{ mm} \quad (3)$$

wherein d is distance between bottoms of the cooling fins, θ is a fin angle in a longitudinal direction of the cooling fin with respect to a rotational direction of the rotor, $H=2h^2/(t_1+t_2)$, $t_1$ is thickness of the bottom of the cooling fin, and $t_2$ is thickness of top of the cooling fin.

8 Claims, 5 Drawing Sheets

ROTOR FOR EDDY CURRENT RETARDER

BACKGROUND OF THE INVENTION

1. Field of the Invention

The present invention relates to a rotor for an eddy current retarder used as an auxiliary braking system of a large vehicle such as a bus and a truck.

2. Description of the Related Art

A large vehicle such as a bus and a truck is equipped with an auxiliary braking system, in addition to a foot braking system which is a main braking system. As the auxiliary braking system, there is, in addition to an exhaust braking system, an eddy current retarder (hereinafter referred to as "retarder") which is capable of steadily reducing speed when the vehicle is descending a long hill and which is effective for preventing damage of burning the foot braking system.

One example of the eddy current retarder will be explained with reference to FIG. 10. A typical retarder comprises a fixed portion 11 including a plurality of magnets 15 provided around a supporting ring 16; and a rotor 12 comprising a rotary shaft 13, a drum 14 connected to the rotary shaft 13, and cooling fins 17 provided around an outer surface of the drum 14. The rotary shaft 13 of the rotor 12 is connected to a propeller shaft of a vehicle, and the drum 14 rotates around the fixed portion 11 together with the rotation of the propeller shaft. The fixed portion 11 is fixed to the vehicle through a mounting plate. The magnets 15 provided around the outer surface of the supporting ring 16 are electromagnets or permanent magnets, and these magnets are disposed in a staggered manner such that their polarities are alternately different from one another.

In the eddy current retarder of such a structure, when the steel drum 14 rotates around the fixed portion which generates a magnetic field, an eddy current is generated in the drum. This eddy current is converted into heat energy, and the drum is heated. That is, kinetic energy (rotational energy) of the vehicle is converted into heat energy, thereby exerting the braking force on the vehicle.

In such a retarder, the kinetic energy of the vehicle is converted into heat energy through the rotor to exert the braking force. Therefore, as frequency of use of the retarder increases, the temperature of the rotor, especially of the drum and the cooling fins rises. If the temperature of the rotor rises, since braking efficiency of the retarder is lowered and the mechanical strength is also lowered, the retarder is liable to be damaged. Therefore, countermeasures are taken against temperature rise of the rotor by providing a large number of cooling fins around the outer surface of the drum to enhance the cooling ability.

The cooling fins (hereinafter referred to as "fins") are usually disposed around the drum in parallel to its center axis in its circumferential direction at equal distances from one another. When the rotor having the parallel plate type fins rotates, air around the rotor is drawn from both ends of the fins toward the center portion, and forcibly pushed outward from the center portion. The fins are cooled by this air flow and thereby, the drum of the rotor is also cooled. As a type of the cooling fins, in addition to the parallel plate type fins which are parallel to the rotary shaft, there are inclined plate type cooling fins which are inclined with respect to the rotary shaft, and V-shaped plate type cooling fins which are bent in the rotational direction.

In the case of a rotor having the parallel plate type fins or the V-shaped plate type fins among the conventional fin type, since the rotational resistance of the rotor is great, energy loss at the time of normal driving of the vehicle requiring no braking operation is great. Therefore, there are problems that the driving force of the vehicle is lowered and fuel economy is lowered, and there are drawbacks that wind noise is great and noise is great. These problems and drawbacks are caused by the fact that streams of air drawn from both ends of the fins collide with each other at the center portion of the fin and then, the air is sent out and thus, the air does not flow smoothly.

Therefore, for the V-shaped cooling fins, Japanese Patent Application Laid-open No. 7-329740 proposes a method for improving the air flow. This publication discloses a rotor having cooling fins in which a center portion of the V-shaped fins, i.e., a bottom portion of the V-shape is notched to form a slit through which air can pass. It is described that since the streams of air introduced from both sides of the V-shaped fins are discharged rearward of the rotational direction from the slit along the rotor surface, the air flows smoothly, and rotational resistance generated by the air collision can be reduced.

However, in the case of the V-shaped cooling fins having the slit, since the streams of air introduced from the both sides of the fins still collide with each other, a portion of the collided air is discharged outward. Therefore, a remarkable reduction of the rotational resistance can not be expected. Further, the drum and fins of the rotor are heated to high temperature as described above, there is a problem that they are deformed due to thermal stress. In order to prevent the deformation, the fins are usually required to function as reinforcing members. However, if a slit is provided in the central portion of the V-shaped, the drum to which the slit is fixed is varied in strength in the axial direction of rotor depending upon positions of the drum. In such a case, deformation is prone to be concentrated on a portion of the drum where the strengths are different. If the deformation is caused repeatedly, there is a problem that this generates cracks.

Further, in the case of the conventional inclined plate type fins, since the surface areas of the fins can be increased, there are merits that it is easy to enhance the cooling ability and to make the air flow constant, the structure is simple, and it is easy to provide the rotor with the function as the reinforcement for the supporting ring.

In the case of the inclined plate type fins, as disclosed in Japanese Utility Model Application-laid open No. 5-33679 for example, if optimal condition is selected, there is a possibility that the air flow between the fins can be made constant (see FIG. 11). However, if the fin angle is too small, since the length of the fin (length of the fin in the longitudinal direction) becomes long, resistance to air flow between the fins is great, and the air flows hard. Further, since the temperature of air flowing between the fins rises, there is a problem that cooling ability is reduced at a rear portion of the fin. On the other hand, if the fin angle is excessively great, it is difficult to smoothly suck the air toward the fins, and since the length of the fin is short, the surface are as of the fins enough for cooling can not be secured. If the distance between the fins is reduced to compensate the surface areas, since the resistance to air flowing between the fins is increased, there are problems that the velocity of flow of air is reduced and the cooling ability is deteriorated.

As a method for overcoming the drawbacks of the inclined plate type fins, Japanese Patent Application Laid-open No. 6-253527 discloses a rotor having fins comprising a short inclined portion for taking in air, and a main portion which are parallel to the rotational direction as shown in FIG. 12. It is described that according to this rotor, it is possible to make the direction of air flow constant, and to restrain the rotational resistance caused by collision of air at a low level.

However, with the fins of this shape, since the channel of air between the fins becomes long, the temperature of air is high at a rear portion of the fin, and the cooling ability is lowered. Further, since the fins are divided, there are problems that the reinforcing effect of the fins is small and thus, the deformation of the drum can not be prevented, and the machining cost is high.

In the case of a currently used rotor, the shape of a fin is determined mainly in view of easiness of manufacture. Therefore, optimal values of the height of a fin, the distance between fins, fin angle with respect to the rotational direction of the rotor are not elucidated. That is, the real picture is that the shape of fin having the most excellent cooling ability is not grasped.

SUMMARY OF THE INVENTION

An object of the present invention is to provide a rotor for an eddy current retarder including cooling fins having excellent cooling ability.

A rotor for an eddy current retarder having a plurality of cooling fins provided around an outer surface of a drum, wherein a transverse cross section of each of the cooling fins is rectangular or trapezoidal, and heights of the cooling fins are equal, and the following expressions (1) to (3) are satisfied:

$$6 \text{ mm} \leq d \leq 11 \text{ mm} \quad (1)$$

$$25° \leq \theta \leq 55° \quad (2)$$

$$20 \text{ mm} \leq H \leq 200 \text{ mm} \quad (3)$$

wherein d: distance between bottoms of the cooling fins

θ: a fin angle in a longitudinal direction of the cooling fin with respect to a rotational direction of the rotor $$H = 2h^2/(t_1 + t_2), \text{ however, } t_1 \geq t_2$$

$t_1$: thickness of the bottom of the cooling fin (unit: mm)

$t_2$: thickness of top of the cooling fin (unit: mm)

h: height of the cooling fin (unit: mm).

Among the above-described conditions, it is preferable that distances between adjacent cooling fins are equal. Further, it is preferable that the distance d between the cooling fins is in a range from 6 to 10 mm, and the fin angle θ of the cooling fin is in a range from 35 to 55°. The upper limit of the H which is an index of effective fin used in the present invention is preferably 150 mm, and more preferably, 100 mm or smaller.

It is possible to further enhance the cooling ability by combining the above-described preferable conditions.

When the rotor of this invention is used as an auxiliary braking system of a vehicle, the temperature of the rotor rises as high as about 600° C. Therefore, it is preferable that the rotor is made of molybdenum steel which comprises 0.05 to 0.15 weight % of C, 0.1 to 0.4 weight % of Si, 0.5 to 1 weight % of Mn, 0.2 to 1 weight % of Mo, 0.5 weight % or less of Ni, 0.01 to 0.03 weight % of Nb, 0.03 to 0.07 weight % of V, 0.0005 to 0.003 weight % of B, 0.02 to 0.09 weight % of Sol.Al, and 0.01 weight % or less of N, and 0.05 weight % or less of P. Especially, the matching of the combination of this material and the above-described conditions of the cooing fins is highest, and the most practical rotor can be obtained by this combination.

BRIEF DESCRIPTION OF THE DRAWINGS

FIGS. 2A and 2B are views for explaining the shape of cooling fins of the rotor of the invention, wherein FIG. 2A is a view of a drum which is developed flatly, and FIG. 2B is a sectional view taken along the line 2B—2B in FIGS. 2A;

DETAILED DESCRIPTION

Figure 1:
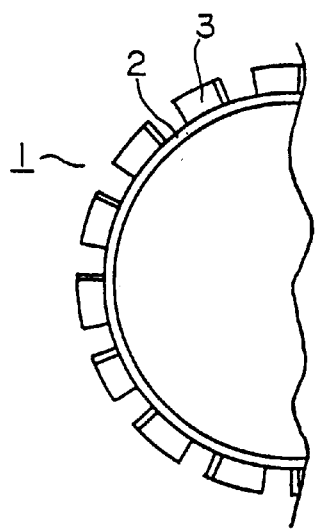
FIG. 1 is a partial side view for explaining a rotor of the present invention.

FIG. 1 is a schematic side view showing a structure of a rotor of the present invention. Cooling fins (hereinafter referred to as "fins") 3 are provided around an outer surface of a drum 2 of a rotor 1. The drum 2 is connected to a rotary shaft of the rotor 1 through a spoke or the like which is not shown. The rotary shaft is connected to a driving system requiring braking force such as a propeller shaft or the like of a vehicle.

Figure 3:
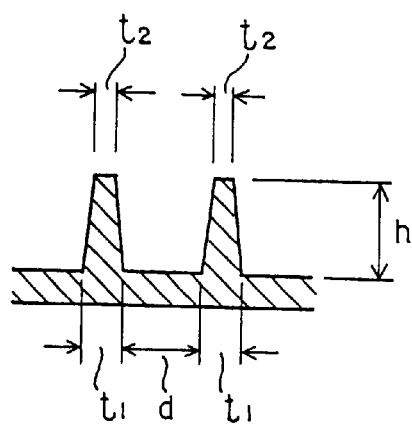
FIG. 3 is a transverse sectional view of the cooling fins of the rotor of the invention, and shows an example of the cooling fins which have a trapezoidal cross section.
Figure 2A:
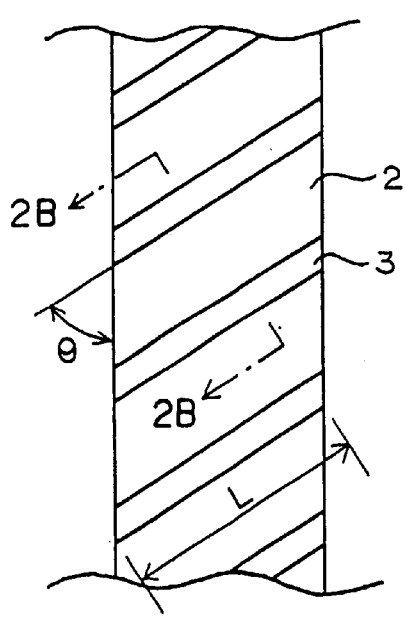
Figure 2B:
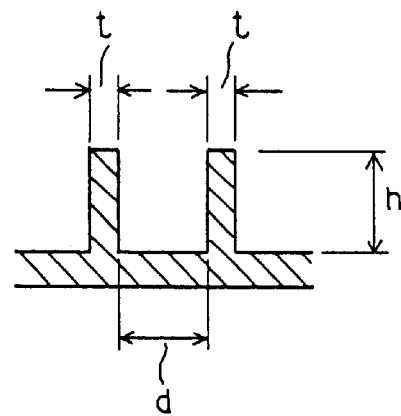

FIGS. 2A, 2B and 3 are views for explaining the shape of the fins 3 and the distance between the fins. FIG. 2A shows a drum 2 which is developed flatly, and FIG. 2B is a sectional view taken along the line 2B—2B in FIG. 2A. The shape of each of the fin 3 is straight plate type which is constant in length L and height h in the longitudinal direction. The plurality of fins 3 are mounted to the outer surface of the drum 2 at equal distances from one another with inclining angle θ with respect to the rotational direction of the rotor 1. The distance between fins is distance d between bottom portions of the fins as shown in FIG. 2B. The transverse cross section of each of the fins is rectangle or trapezoidal. If the transverse cross section is rectangle, the thickness is set to t, and if the cross section is trapezoidal, the thickness of the bottom of the fin is set to $t_1$, and the thickness of the top of the fin is set to $t_2$ as shown in FIG. 3. In the following description, in order to simplify the explanation, a case in which the transverse cross section of the fin is rectangle and the thickness is t will be explained first and then, a case of the trapezoidal cross section will be explained later.

The rotor of the invention is characterized in that the above-mentioned expressions (1) to (3) are satisfied under such conditions. Necessity for satisfying the expressions (1) to (3) will be explained concretely below.

Experimental data used for the following explanation was obtained from results of the search of cooling ability conducted by preparing experimental rotors which were made from molybdenum steel having said chemical composition and provided with cooling fins having various values of the above mentioned parameters, and then by applying those rotors to an experimental retarder.

Fin Distance d

The distance d between the fins is set to 6 to 11 mm. If d exceeds 11 mm, the cooling ability of the rotor is lowered as the d is increased. On the other hand, if d is smaller than 6 mm, it is difficult to fabricate the fin. That is, even if the machining method is a cutting for removing a portion between the fins so as to preserve the fins on a drum, or a welding for jointing the fins to a drum, if d is smaller than 6 mm, it is difficult to produce the rotor. Namely, d of smaller than 6 mm is not suitable for manufacture of the rotor in industrial scale. In view of the cooling ability and productivity, the range of d is set to 6 to 11 mm.

The relation between the magnitude of d and the cooling ability will be explained concretely below.

Heat radiation amount Q from the entire surface of the rotor is expressed as the sum of heat radiation amount $Q_f$ from the fin surface, and heat radiation amount $Q_b$ from an outer surface of the drum between the fins. If the average heat transfer coefficient α is constant on the fin surface and on the outer surface of the drum, and if the temperature distribution of the fin can be expressed by one dimensional heat conductivity equation, Q, $Q_f$ and $Q_b$ are expressed by the following expression:

$$Q=Q_f+Q_b$$

$$Q_f=\alpha A_f(T_f-T_a)$$

$$Q_b=\alpha A_b(T_b-T_a)$$

wherein the average temperature of the fin surface is $T_f$, the surface are a of the fin is $A_f$, the temperature of the drum surface is $T_b$, the surface area of the drum is $A_b$, and the air temperature is $T_a$.

Further, the fin efficiency η can be defined as follows:

$$\eta=(T_f-T_a)/(T_b-T_a)=(\tan h\ m)/m$$

$$m=h\{(\alpha P)/(\lambda A)\}^{1/2}$$

wherein λ: heat conductivity of the fin material

P: length of circumference of the cross section of the fin which is perpendicular with respect to a surface including the rotary shaft of the rotor and the center portion of the fin A: Area of the cross section of the fin From these relations, the following expression is obtained:

$$Q=\{(m^2\lambda A)/(h^2P)\}(T_b-T_a)\{A_f(\tan h\ m)/m+A_b\}$$

Figure 4:
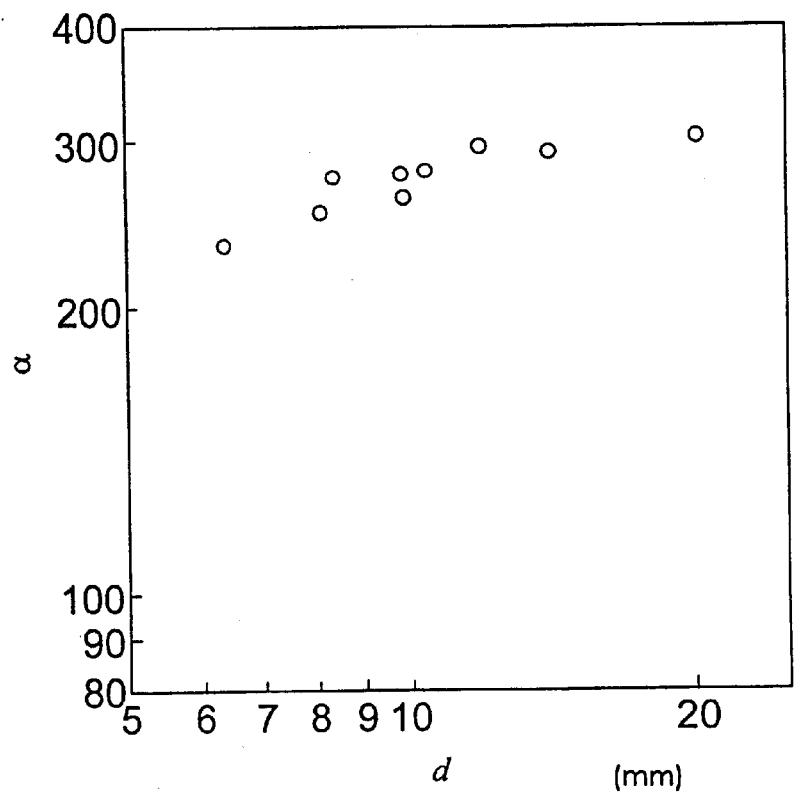
FIG. 4 is a view showing the relation between the distance d between the fins and the average heat transfer coefficient α.

In the above expression, although all of the parameters except α is known, it is not possible to directly solve this expression. Therefore, heat transfer coefficient α was obtained by repeating calculation. The relation between the obtained heat transfer coefficient α and the distance d is shown in FIG. 4. The number of revolution of the rotor is set to 3,000 rpm which corresponds to the maximum revolution number of the rotor which is actually used.

It can be found from FIG. 4 that if the fin distance d is 11 mm or smaller, the heat transfer coefficient a becomes lower as d is reduced, and the heat transfer coefficient α is substantially constant in a region exceeding 11 mm. Since α represents the average heat transfer coefficient of a heat transfer surface, the heat radiation amount Q from the entire surface of the rotor can be expressed by the following expression:

$$Q=\alpha(\eta A_f+A_b)(T_b-T_a)$$

If d exceeds 11 mm, α is constant as described above. However, since the number of fins is reduced, the surface are a $A_f$ of the fins is reduced. Therefore, Q in the above expression, i.e., the cooling ability of the rotor is reduced as d is increased.

On the other hand, if d is 11 or smaller, α is reduced as d is reduced. However, since the number of fins can be increased, it is possible to increase $A_f$. Therefore, it is possible to enhance the cooling ability of the rotor by appropriately setting the thickness t of the fin as will be described later.

From these points of view, the distance d between the fins is set in a range from 6 to 11 mm. In order to secure the number of fins to further enhance the cooling ability, it is preferable to set the upper limit of d to 10 mm.

In the case of the rotor of the invention, it is preferable that the fins are disposed at equal distances from one another, i.e., the distances between adjacent fins are identical with one another. However, since the distances may be differ in the range from 6 to 11 mm. However, since the rotor rotates at high speed, it is necessary to set the center of balance on the rotary shaft so as not to generate vibration due to the rotation.

$$H=2h^2/(t_1+t_2):$$

In the present invention, the range of $2h^2(t_1+t_2)$ (=H) is set in a range from 20 to 200 mm. If H exceeds 200 mm, the fin efficiency, namely the cooling efficiency of fins, is lowered, and if H is smaller than 20 mm, resistance to rotation is as remarkably increased due to increase in weight of the rotor, and overall performance as a rotor is deteriorated.

The reason why the upper limit of H is set to 200 mm will be explained below.

If the height h of the fin is increased, the surface area of the fin is increased. However, since the temperature of the tip end portion of the fin is reduced, the heat radiation amount from the tip end is reduced. In order to allow the fin to release the heat effectively from the bottom to the tip end of the fin, it is necessary to increase the flow of heat from the bottom to the tip end. That is, the cross section of the fin must be increased. From this fact, it can be found that in order to effectively release the heat from the fins, the relation between h and t needs to be set appropriately.

The relation between the fin efficiency η and h as well as t (if the transverse cross section of the fin is rectangular) can be expressed as follows. The explanation as to how these expressions were lead out will be omitted.

$$\eta=(\tan h\ m)/m$$

$$m\approx\{(2\alpha/\lambda)(h^2/t)\}^{1/2}$$

Figure 5:
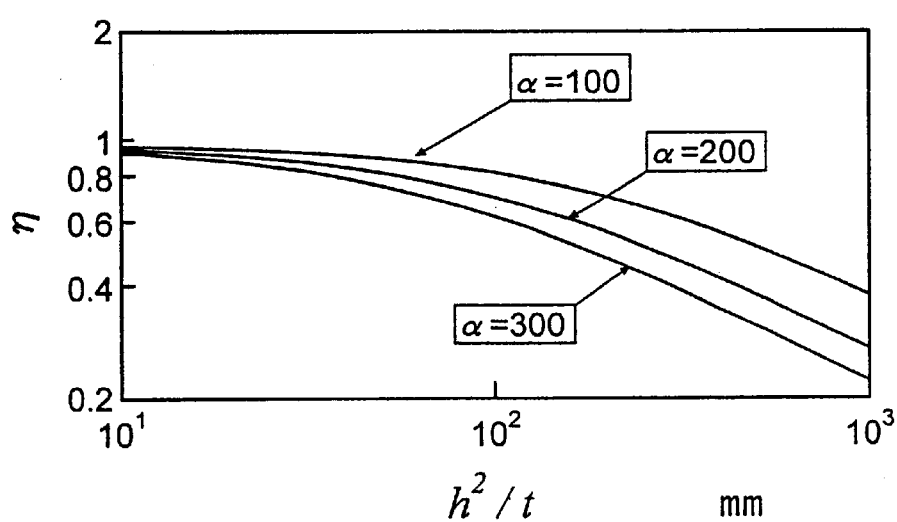
FIG. 5 is a view showing the relation between H ($=h^2/t$) and fin efficiency η.

By substituting values of the heat transfer coefficient α and the heat conductivity λ into these expressions, a value of η is calculated. 30 kcal/hr·m·°C. was assigned to λ of the steel drum which is a strong magnetic material. 100 kcal/hr·m²·°C., 300 kcal/hr·m²·°C. and 200 kcal/hr·m·°C. were assigned to α respectively as the lower limit, the upper limit and the intermediate values of the heat transfer coefficient of an actual motor. Then, the relation between the fin efficiency η and H (=h²/t) was obtained. FIG. 5 shows its result.

There is a tendency that the fin efficiency η is higher as α is smaller. If the temperature distribution of the fin is constant and the temperature is of the bottom of the fin, η indicates what percentage of the enlarged heat transfer area by the fin actually contributes the heat radiation, and it is preferable that its value is about 0.5 or greater. If a range H (=h²/t) within which η becomes about 0.5 or greater is obtained from FIG. 5, in the case of 300 kcal/hr·m²·°C. which is the upper limit of α, the range is 200 mm or less. From this result, H (=h²/t) is determined to be 200 mm or less.

In order to further enhance the cooling ability of the fin, it is preferable that α is set to be 200 kcal/hr·m²·°C. and the fin efficiency η is set to be 0.6, and in this a case, the upper limit of H becomes 150 mm, and if η is set to be 0.7, the upper limit of H becomes 100 mm. Therefore, it is preferable that the upper limit of H is 150 mm, and 100 mm is more preferable.

Fin Angle θ

In the present invention, the inclination angle (hereinafter referred to as "fin angle") of the fin in its longitudinal direction with respect to the rotational direction of the rotor was set in a range from 25° to 55°.

As described above, if the fin angle θ is small, the length of the fin is increased and thus, the surface are a of the fin is increased. However, if θ is too small, a thermal boundary layer is developed in the vicinity of the fin at a rear portion (at the side of the exit of air flow) in the longitudinal direction of the fin and thus, the heat transfer coefficient is lowered. On the other hand, if θ is too great, the angle taking the air in is increased excessively, which makes it impossible to take air in toward the fins. As a result, the flow rate of air flowing between the fins is lowered. Therefore, if θ is too small or too great, the cooling ability of the fin is lowered.

Figure 6:
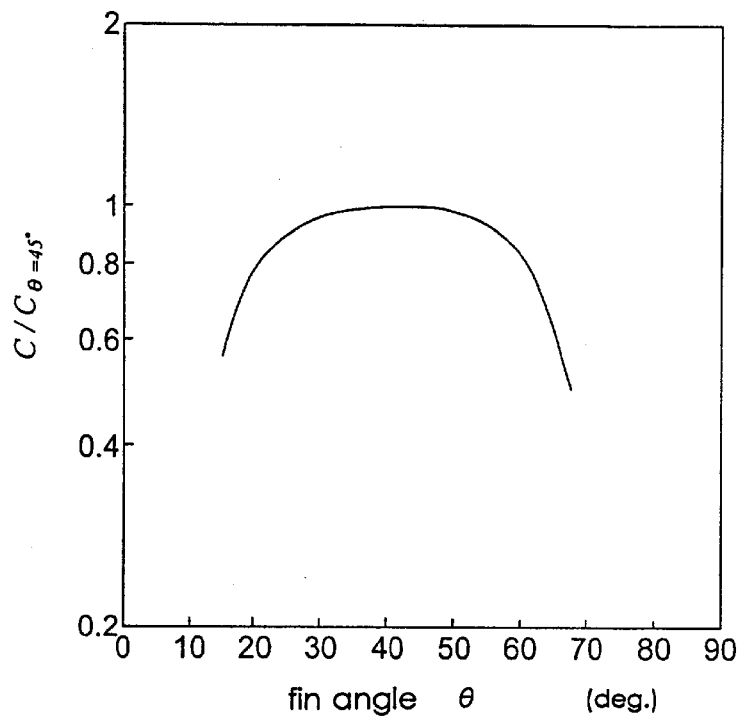
FIG. 6 is a view showing the relation between the fin angle θ and thermal conductance ratio $C/C_{\theta=45°}$.

FIG. 6 shows the relation between the fin angle θ and the cooling ability obtained by experiment. The cooling ability is indicated by thermal conductance C of the rotor. C can be obtained by the following expression.

$$C = Q/(T_b - T_a)$$

The longitudinal axis in FIG. 6 shows ratio: $C/C\theta_{=45°}$ of the thermal conductance in each of the fin angles θ with respect to the thermal conductance: $C\theta_{=45°}$ when θ is 45°. It can be found that if θ is less than 25° or exceeds 55°, the cooling ability is remarkably lowered.

In the present invention, the range of θ is set to be from 25° to 55° in view of the above points.

It is preferable that the lower limit of θ is 35° for preventing the cooling ability from lowering due to decrease in heat transfer coefficient of the rear portion (at the side of the exit of air flow) of the fin in the longitudinal direction.

Shape of a Transverse Cross section of the Fin

The transverse cross section of the fin of the rotor in the present invention may be rectangular or trapezoidal whose bottom portion is thick. In generally, temperature is reduced from the base portion toward the tip end of a fin used for cooling. Therefore, the heat radiation amount per unit area becomes smaller toward the tip end of the fin, and an amount of heat passing through the cross section which is perpendicular to the height direction of the fin also becomes smaller. Thus, no problem is caused even if the thickness of the transverse cross section of the fin is reduced from the base portion toward the tip end of the fin, i.e., from the bottom toward the top of the fin. This design is rather advantageous if the cooling ability per weight of the fin is taken into consideration.

Figure 7:
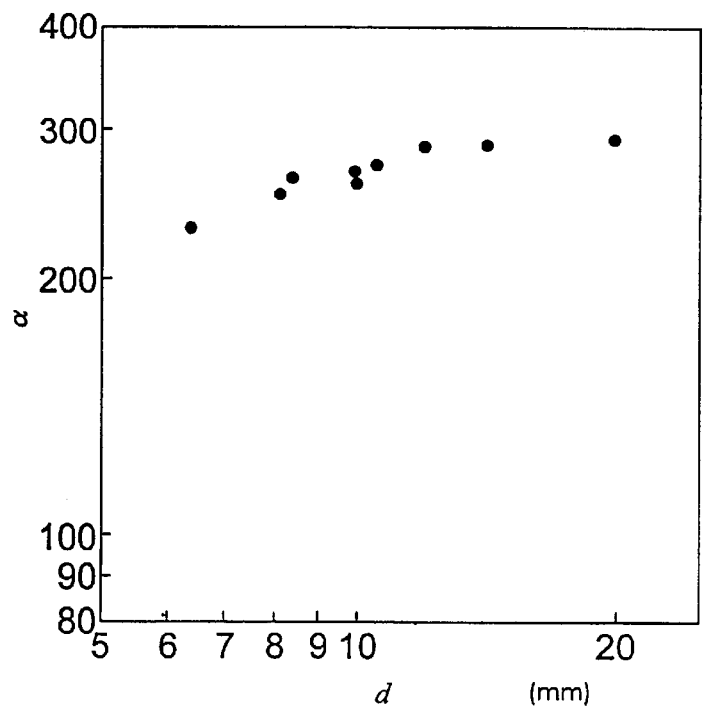
FIG. 7 is a view showing the relation between the average heat transfer coefficient α and the distance d between the fins concerning the fins having a trapezoidal cross section.

FIG. 7 shows results of search of the cooling ability of the rotor whose fin has trapezoidal cross section. As can be seen in FIG. 7, the relation between the average heat transfer coefficient α and the distance d between the fins (between the bottoms of the fins) is quite the same as the case of the rectangular cross section shown in FIG. 4. This result was obtained by using $(t_1+t_2)/2$ instead of the thickness t of the fin having the rectangular cross section. Therefore, h²/t can be expressed as $2h^2/(t_1+t_2)$.

From the above-described results, H was expressed as $2h^2/(t_1+t_2)$ for covering both rectangular and trapezoidal cross sections of the fins, and its range was set to be the same as the rectangular cross section.

Material for a Rotor

The rotor of the present invention is used for a retarder which is an auxiliary braking system of mainly a large vehicle. In such a case, since a great braking force is required, the rotor temperature may rise as high as 600° C. Material of the rotor used for such a use is required to be excellent in oxidation resistance and high temperature strength in addition to strong magnetic properties and machinability.

Therefore, chromium molybdenum steel or molybdenum steel is suitable as the material of the rotor. Especially, in view of the above-described conditions of the rotor of the present invention, the most suitable material is a molybdenum steel comprising 0.05 to 0.15 weight % of C, 0.1 to 0.4 weight % of Si, 0.5 to 1 weight % of Mn, 0.2 to 1 weight % of Mo, 0.5 weight % or less of Ni, 0.01 to 0.03 weight % of Nb, 0.03 to 0.07 weight % of V, 0.0005 to 0.003 weight % of B, 0.02 to 0.09 weight % of Sol.Al, and 0.01 weight % or less of N, 0.05 weight % or less of P, and the balance substantially being Fe.

Although the rotor of the present invention suffices if the above-described conditions can be satisfied, a rotor having more excellent cooling ability can be obtained by combining preferable conditions among the above-described conditions.

When the outer diameter of the rotor including the fins is about 430 mm, especially preferable practical conditions are that the transverse cross section of the fin is rectangular, the thickness t of the fin is 3 to 4 mm, the height h is 12 to 15 mm, the distances between the adjacent fins are equal, d is 8 to 11 mm, and the fin angle θ is about 45°.

EMBODIMENTS

First Embodiment

Cooling ability of a rotor whose fin has rectangular transverse cross section was searched. A drum of the rotor used for the search has outer diameter of 326.5 mm, width of 64 mm, and thickness of 8 mm. Height h of the fin is 15 mm, thickness t is 4.0 mm, the number of fins is 52, distance d between the fins is 9.94 mm, and the fin angle θ in the longitudinal direction of the fin with respect to the rotational direction of the rotor is 45°, H(=h²/t) is 56.25 mm. This rotor is an example of the present invention that satisfies all of the conditions defined in the invention.

As a comparative example 1-1, there was prepared a rotor in which thickness of the fin was 3.0 mm, the number of fins was 45, distance between the fins was 13.1 mm, the fin angle was 45°, H was 75 mm, and other conditions were the same as those of the above described example of the present invention. The distance d between the fins of this rotor is out of the range defined in the present invention. Further, as another comparative example 1-2, there was prepared a rotor in which fin height h was 8 mm, H was 16 mm and other conditions were the same as those of the above described example of the present invention.

Drums and fins of the rotors of the example of the present invention and the comparative example are made from a molybdenum steel comprising 0.09 weight % of C, 0.31 weight % of Si, 0.73 weight % of Mn, 0.66 weight % of Mo, 0.2 weight % of Ni, 0.01 weight % of Nb, 0.05 weight % of V, 0.0011 weight % of B, 0.04 weight % of Sol.Al, and 0.004 weight % of N, 0.03 weight % of P. The rotors were prepared by a method in which cylindrical blank materials were cut to form fins.

Each of the drums of the rotors was disposed such as to surround an outer surface of a supporting ring around which permanent magnets of different polarities were disposed in a staggered manner such that their polarities were alternately different from one another. Eddy current was generated in the drum of the rotor by rotating the rotor by a motor at predetermined revolution number (600, 1200, 1800, 2400 and 3000 rpm). With this method, braking force was generated on the rotor. A thermocouple was previously embedded in the drum of the rotor at positions of 2 mm depth from inside, and the temperature of the drum was measured when the temperature assumed to be a steady state at each of the revolution numbers. Further, braking torque of the rotor was obtained from a torquemeter mounted to the rotary shaft of the motor.

The cooling ability was evaluated by a method which expressed the cooling ability of the rotor as thermal conductance in such a manner that a heat generation value of the drum was calculated from the braking torque obtained by the above-described measurement, and the heat generation value was divided by a difference between the temperature of the drum and the atmospheric temperature.

Figure 8:
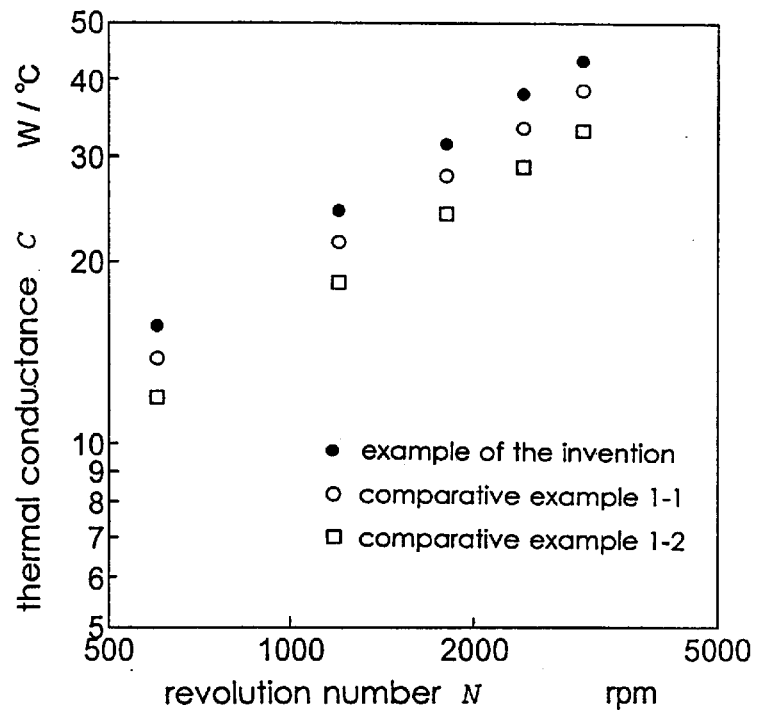
FIG. 8 is a view showing the cooling ability of a rotor obtained in the first embodiment.

FIG. 8 shows the relation between the revolution number of the rotor and the thermal conductance C. It can be found that at any of the revolution numbers, the example of the invention has higher thermal conductance as compared with the comparative example, and is excellent in the cooling ability. In the case of the example of the invention, the cooling ability is enhanced by about 11% as compared with the comparative example 1-1, and by about 20% as compared with the comparative example 1-2.

Second Embodiment

Cooling ability of a rotor whose fin has trapezoidal transverse cross section was searched. A drum of the rotor used for the search is the same as that of the first embodiment. Height h of the fin is 13.5 mm, thickness of bottom of fin $t_1$ is 7.0 mm, thickness of top of fin $t_2$ is 3.0 mm, the number of fins is 42, distance d between the bottoms of fins is 10.3 mm, and the fin angle θ in the longitudinal direction of the fin with respect to the rotational direction of the rotor is 45°, $h^2/(t_1+t_2)$ is 36.45 mm. This rotor is an example of the present invention that satisfies all of the conditions defined in the invention.

As a comparative example, there was prepared a rotor in which thickness of bottom of fin was 4.0 mm, thickness of top of fin was 2.0 mm, the number of fins was 44, distance between bottoms of fins was 12.5 mm, $h^2 (t_1+t_2)$ was 60.75 mm, and other conditions were the same as those of the above described example of the present invention. The distance between the fins of this rotor is out of the range defined in the present invention.

Material and machining method of the rotor is the same as that of the first embodiment.

Figure 9:
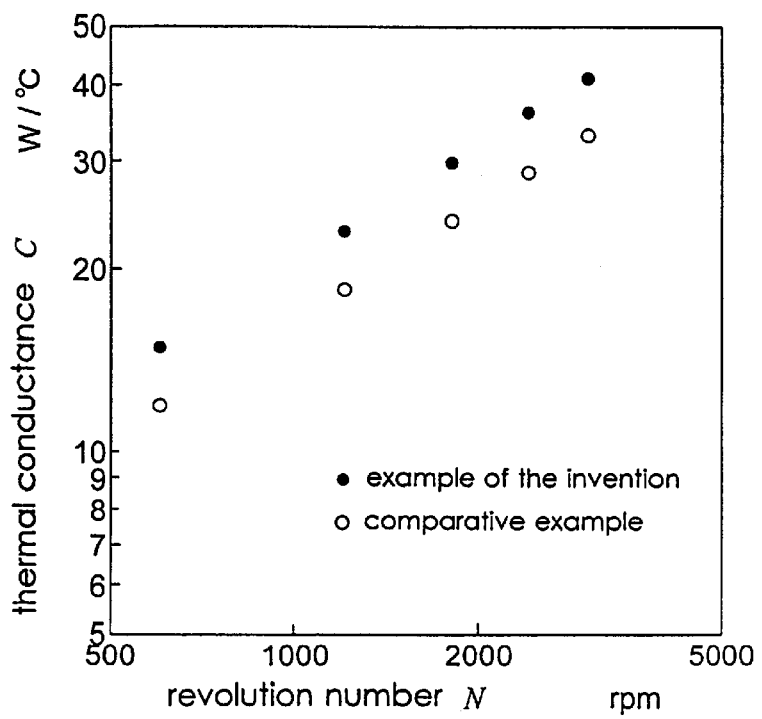
FIG. 9 is a view showing the cooling ability of a rotor obtained in the second embodiment.
Figure 10:
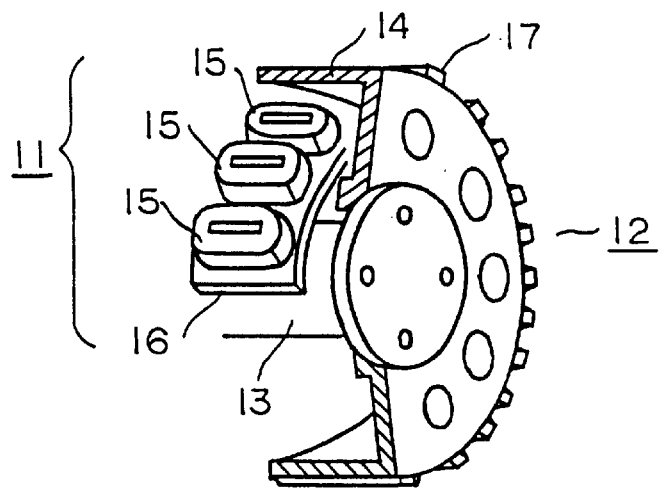
FIG. 10 is a view for explaining a structure of a generally used eddy current retarder.
Figure 11:
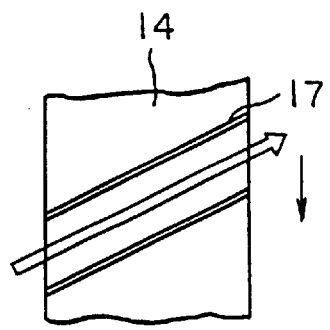
FIG. 11 is a view for explaining air flow in a conventional rotor having fins inclined with respect to the rotational direction.
Figure 12:
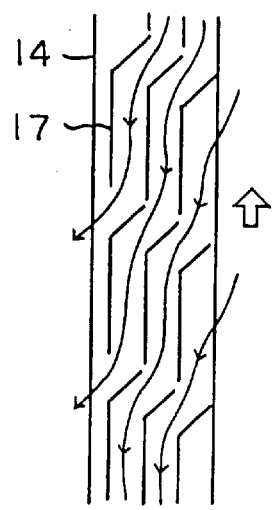
FIG. 12 is a view for explaining air flow in another conventional rotor having fins inclined with respect to the rotational direction.

FIG. 9 shows the relation between the revolution number of the rotor and the thermal conductance. It can be found that at any of the revolution numbers, the example of the invention has higher thermal conductance as compared with the comparative example, and is excellent in the cooling ability. In the case of the example of the invention, it was confirmed that the cooling ability was enhanced by about 13% as compared with the comparative example.

As apparent from the above explanation and embodiments, in the case of the rotor for an eddy current retarder of the present invention, the fin is of flat plate shape, and is inclined with respect to the rotational direction of the rotor. Further, optimal conditions of fin angle, height of fin, thickness, length and distance between fins are selected while taking the cooling ability into consideration, and easiness of production is also taken into consideration. Therefore, the rotor of the invention is excellent in cooling ability, and in durability and productivity.

As apparent from above, the rotor of the invention is extremely suitable as a rotor for an eddy current retarder of a large vehicle.

What is claimed is:

1. A rotor for an eddy current retarder having a plurality of cooling fins provided around an outer surface of a drum, wherein the rotor comprises 0.05 to 0.15 weight % of C, 0.1 to 0.4 weight % of Si, 0.5 to 1 weight % of Mn, 0.2 to 1 weight % of Mo, 0.5 weight % or less of Ni, 0.01 to 0.03 weight % of Nb, 0.03 to 0.07 weight % of V, 0.0005 to 0.003 weight % of B, 0.02 to 0.09 weight % of Sol.Al, and 0.01 weight % or less of N, 0.05 weight % or less of P, and the balance substantially Fe, and a transverse cross section of each of the cooling fins is rectangular or trapezoidal, and heights of the cooling fins are equal, and the following expressions (1) to (3) are satisfied:

$$6 \text{ mm} \leq d \leq 11 \text{ mm} \quad (1)$$

$$25° \leq \theta \leq 55° \quad (2)$$

$$20 \text{ mm} \leq H < 200 \text{ mm} \quad (3)$$

wherein d: distance between bottoms of the cooling fins

θ: a fin angle in a longitudinal direction of the cooling fin with respect to a rotational direction of the rotor $H = 2h^2/(t_1+t_2)$, however $t_1 \geq t_2$ $t_1$: thickness of the bottom of the cooling fin (unit: mm)

$t_2$: thickness of top of the cooling fin (unit: mm)

h: height of the cooling fin (unit: mm).

2. A rotor according to claim 1, wherein distances between the adjacent cooling fins are equal.

3. A rotor according to claim 1, wherein the distance d between the cooling fins is in a range from 6 to 10 mm, and the distances between the adjacent cooling fins are equal.

4. A rotor according to claim 1, wherein the θ is in a range from 35° to 55°.

5. A rotor according to claim 1, wherein the H is in a range from 20 mm to 150 mm.

6. A rotor according to claim 1, wherein the H is in a range from 20 mm to 100 mm.

7. A rotor according to claim 2, wherein the H is in a range from 20 mm to 150 mm.

8. A rotor according to claim 2, wherein the H is in a range from 20 mm to 100 mm.

* * * * *